Patented Jan. 30, 1940

2,188,386

UNITED STATES PATENT OFFICE 2,188,386

SHEET MATERIAL HAVING CRYSTALLINE EFFECTS

Joseph H. Brown, Brooklyn, N. Y., assignor to Celluloid Corporation, a corporation of New Jersey No Drawing. Application June 7, 1935, Serial No. 25,419

15 Claims. (Cl. 154—2)

This invention relates to sheet material and to articles made therefrom, which sheet material contains derivatives of cellulose and is characterized by having a surface broken by closely spaced small ridges or wrinkles running at random across the same giving the appearance of a crystalline or crackled surface.

An object of the invention is the economic and expeditious production of ornamental and decorative sheet material containing a derivative of cellulose as the basic material. Other objects of the invention will appear from the following detailed description.

By employing the method of this invention, there may be formed an improved sheet material having an effect differing from any heretofore formed. The effect is exceptionally useful in the forming of articles such as lamp shades, etc. The design or effect produced in the sheet material, by the present invention, is that of minute ridges or wrinkles running in a heterogeneous manner yet substantially uniformly distributed over the area of the material giving a "crackled" appearance to the material.

In accordance with my invention, then, I form a sheet material having an appearance and other properties adapting it for use in surfacing, decorating and ornamenting flat or shaped articles. The sheet material I form from films, foils or sheets containing derivatives of cellulose by laminating the same with a similar film, foil or a sheet, or a film, foil or sheet of other material with the aid of an adhesive, and while so laminated I crush, twist, rope or otherwise crease or wrinkle the same. After the pattern is placed in the laminated films or foils, they may be pressed, ironed, smoothed or otherwise flattened, without destroying the finish, by passing them through calendering or laundering rolls. The sheet material may be used in the laminated form or each sheet may be stripped from the others to form single sheets, films or foils and used as such.

This invention is applicable to the formation of single or laminated sheets, containing derivatives of cellulose for decorative purposes. Any suitable derivative of cellulose may be employed as the base material of at least one of the sheets. For instance, I may employ sheets of cellulose nitrate or sheets or organic acid esters of cellulose or cellulose ethers. Examples of organic acid esters of cellulose are cellulose acetate, cellulose formate, cellulose propionate and cellulose butyrate, while examples of cellulose ethers are ethyl cellulose, methyl cellulose and benzyl cellulose.

While any suitable thickness of sheet may be employed, I prefer to use those types of sheets normally referred to as films or foils and which may have a thickness of from .0007 to .01 of an inch. These films or foils may be made by any suitable method such as casting the same from a solution containing a derivative of cellulose in a volatile solvent upon a film-casting wheel or by extruding the same through a suitable shaped orifice into an evaporative or precipitating medium. Although the above two methods are those normally employed in forming films and foils, they may also be formed by slicing the same from a relatively thick block of the derivative of cellulose.

The film or foil may contain, besides the derivative of cellulose base material, other materials that effect the physical properties of the resultant film or foil, such as dyes or lakes, pigments, fire retardants, filling materials, plasticizers, waterproofing agents, etc. Any suitable dye or lake may be employed that has an affinity for the particular derivative of cellulose employed. The film or foil may also be colored by the incorporation therein of colored pigments such as the colored oxides and salts of metals, or the colored organic compounds having no affinity for the derivative of cellulose employed. The material may be made fire proof or slow burning by the inclusion therein of beta chlornaphthalene, hydrated calcium phosphate, triphenyl phosphate, tricresyl phosphate and the like.

The film or foil preferably has from 5 to 100 parts or more of plasticizer based on the weight of the derivative of cellulose present. The amount of plasticizer employed will depend upon the desired hand of the resulting material, the type and quantity of included materials present and other similar variables. The plasticizers may be any of the high boiling solvents or softening agents as for example; the aryl sulphonamides such as para ethyl toluol sulphonamide, the alkyl phthalates such as dimethyl phthalate, the dialkyl tartrates such as dibutyl tartrate, the alkoxy esters of polybasic organic acids such as dimethoxy ethyl phthalate, the polybasic acid esters of the mono alkyl ethers of polyhydric alcohols such as diethylene glycol ethyl ether ester of phthalic acid, the alkyl ester of phosphoric acid such as triethylglycol phosphate, the aryl esters of phosphoric acid such as tricresyl phosphate, the mixed alkyl and aryl phosphates such as ethylglycol dicresyl phosphate, glycerol esters such as triacetin and camphor.

The sheet material having a crystalline, wrinkled or crackled effect may be made by uniting or superimposing two layers or more of thin film or foil, one of which contains derivatives of cellulose, with a suitable adhesive such as shellac and crinkling the composited film either by hand or machine. For instance, relatively long strips of the foil containing intermediate layers of shellac may be superimposed upon each other and these strips crinkled or crushed by a method known in the rope manufacture industry as "rope walking". The ropewalking operation is performed by taking a strip of laminated layers of films or foils, say, 50 feet long, and looping this around the hub of a slow moving wheel or propellor, the operator pulling the two ends of the strip tight by walking away from the moving device. When the shaft or propeller rotates, it twists the films into the form of a heavy rope, the operator being forced to walk slowly toward the machine. Upon unwinding he steps back and the operation may be repeated in the opposite direction if it is desired to increase or make more uniform the crinkle effect. After unfolding, the film may be ironed, smoothed or flattened either by hand or by passing it through calendering or laundering rolls without destroying the finish.

Any suitable type of adhesive may be employed for cementing the various layers of the laminations together prior to roping or crushing. It is not important that the adhesive agent be such that there is an excellent bonding action between the layers, for in many cases it may be desired to strip the various layers from each other after roping or crushing. Also, for many purposes, a perfect adhesion is not necessary and the material may be sewed or covered at the edges to hold the same together. The adhesive may be shellac, either refined, i. e. bleached, dewaxed, moisture-free, etc., or the commercial grade of orange shellac such as sold in paint stores may be employed. The shellac for application to the film is preferably dissolved or dispersed in a vehicle or a thinner. The solvent vehicle may be denatured grain alcohol, wood alcohol or the like. While the preferred concentration is 5 lbs. of shellac to a gallon of thinner, other suitable proportions may be used such as from 3 to 8 or more lbs. of shellac to the gallon of thinner.

As an aid in causing the adhesive agent to bind the sheets together small quantities of strong solvents for the derivative of cellulose employed may also be added to the shellac. For instance, the adhesive material may contain, besides shellac and the vehicle, small quantities of acetone, methyl cellosolve, methyl cellosolve acetate, diacetone alcohol, etc. If desired, the shellac may be entirely replaced by other adhesives such as those described in the U. S. Patents Nos. 1,981,141 and 1,950,954 issued to A. F. Caprio. Adhesives as described in U. S. Patent No. 1,925,903 may also be used.

Effect materials may be added to the laminated structure by incorporating the same or suspending the same in the adhesive or to the moistened surface of the film or foil. Any suitable effect material may thus be added, for instance, zinc oxide, aluminum powder, dyes, silky variety of mercurous chloride, siliceous matter such as diatomaceous earths, tinsel (Lahn), pearl flakes, silk or metallic threads.

When roping the laminated films or foils that have been bound together with shellac there may be a likelihood, due to excessive softening attack of the adhesive, for the twisted mass to stick together and resist unwinding. To overcome this a muslin cloth, netting or other suitable interlaying material may be used to prevent the folds sticking together in a rope walking operation. Also, to overcome this sticking of the folds together a layer of regenerated cellulose or film containing chemically treated rubber may be employed as one of the outer layers. For instance, two films or foils of cellulose acetate may be superimposed upon one film or foil of regenerated cellulose and the three crushed or wrinkled by a rope walking process.

The resultant crystalline product while laminated or after stripping the various laminations to individual sheets of crystalline material may be subjected to embossing and pleating operations to produce novel ornamental effects. This material may also be laminated with other materials such as paper, fabric, etc. Dye solutions may be applied to the rough surface and the excess of the coloring matter wiped off, and the material subjected to lamination between glass plates to yield artistic decorative articles. Further, the material may be molded, composited, stretched, blown, slit into narrow ribbon form, printed or otherwise shaped, colored or designed.

The crinkled sheet material may be used for countless purposes. For instance, a transparent variety either in the single sheet or in the laminated sheets may be employed as lamp shades, screens and like uses wherein light is transmitted through the material producing a beautiful crystalline effect. The filled variety or pigmented variety as well as the transparent material may be laminated or veneered with wood panels, metal, leather, cloth, etc. to form wall decorations, table tops and similar uses producing a crackled effect similar to that obtained by spraying with lacquers. Pocketbooks, wearing apparel, millinery parts, etc. may be made from the foil itself, especially the laminated variety either alone or after veneering the same to leather or cloth. When employing a cementing material which forms a substantially permanent bond between various layers of the product, the same may be used for upholstery purposes and similar places where a substantial amount of wear is imposed upon the article.

Glass or other transparent articles may be covered with the crinkled sheet material to produce desired frosted effects. This material is transparent to ultra violet rays and hence there will not be interference with the transmission of beneficial rays of the sun. In this use it is of exceptional value for use in window screens, lamp shades, folding screens and the like.

It is to be understood that the foregoing detailed description is given merely by way of illustration and many variations may be made therein, without departing from the spirit of my invention.

Having described my invention, what I desire to secure by Letters Patent is:

1. In a method of producing a crinkled sheet material containing a derivative of cellulose, the steps of causing at least two films containing a derivative of cellulose to adhere together by the action of a cement, crinkling the laminated material and smoothing out the crinkled material.

2. In a method of producing a crinkled sheet material containing cellulose acetate, the steps of causing at least two films containing cellulose acetate to adhere together by the action of a cement, crinkling the laminated material and smoothing out the crinkled material.

3. In a method of producing a crinkled sheet material containing a derivative of cellulose, the steps of causing at least two films containing a derivative of cellulose to adhere together by the action of a shellac, crinkling the laminated material and smoothing out the crinkled material.

4. In a method of producing a crinkled sheet material containing cellulose acetate, the steps of causing at least two films containing cellulose acetate to adhere together by the action of a shellac, crinkling the laminated material and smoothing out the crinkled material.

5. In a method of producing a crinkled sheet material containing a derivative of cellulose, the steps of laminating with the aid of a cement at least two sheets having a thickness less than .02 inch formed of a derivative of cellulose, roping the laminated material and smoothing out said material.

6. In a method of producing a crinkled sheet material containing cellulose acetate, the steps of laminating with the aid of a cement at least two sheets having a thickness less than .01 inch formed of cellulose acetate, roping the laminated material and smoothing out said material.

7. In a method of producing a crinkled sheet material containing a derivative of cellulose, the steps of laminating with the aid of a shellac at least two sheets having a thickness less than .01 inch formed of a derivative of cellulose, roping the laminated material and smoothing out said material.

8. In a method of producing a crinkled sheet material containing cellulose acetate, the steps of laminating with the aid of a shellac at least two sheets having a thickness less than .01 inch formed of cellulose acetate, roping the laminated material and smoothing out said material.

9. In a method of producing a crinkled sheet material containing a derivative of cellulose, the steps of laminating at least two sheets containing derivatives of cellulose with the aid of a cement, superimposing upon the laminated article a sheet of cellulosic material, roping the composite article, smoothing out the rope and stripping the cellulosic sheet from same.

10. In a method of producing a crinkled sheet material containing cellulose acetate, the steps of laminating at least two sheets containing cellulose acetate with the aid of a cement, superimposing upon the laminated article a sheet of cellulosic material, roping the composite article, smoothing out the rope and stripping the cellulosic sheet from same.

11. In a method of producing a crinkled sheet material containing a derivative of cellulose, the steps of laminating at least two sheets containing derivatives of cellulose with the aid of a shellac, superimposing upon the laminated article a sheet of cellulosic material, roping the composite article, smoothing out the rope and stripping the cellulosic sheet from same.

12. In a method of producing a crinkled sheet material containing cellulose acetate, the steps of laminating at least two sheets containing cellulose acetate with the aid of a shellac, superimposing upon the laminated article a sheet of cellulosic material, roping the composite article, smoothing out the rope and stripping the cellulosic sheet from same.

13. A crinkled sheet material consisting of a plurality of thin crinkled sheets which contain derivatives of cellulose and which are cemented together, the crinkling on each of the said sheets being substantially identical and the sheets being disposed so that the crinkling on the adjacent sheets is in register.

14. A crinkled sheet material consisting of a plurality of thin crinkled sheets which contain cellulose acetate and which are cemented together, the crinkling on each of the said sheets being substantially identical and the sheets being disposed so that the crinkling on the adjacent sheets is in register.

15. A process for producing crinkled sheet material, comprising the steps of laminating two sheets of cellulosic material, one of which consists of non-fibrous cellulosic material, twisting said sheets into a substantially cylindrical compact mass under sufficient tension to produce a plastic deformation of said material resulting in a multiplicity of fine, irregular wrinkles, and thereafter untwisting said mass.

JOSEPH H. BROWN.